United States Patent [19]

Gaiser et al.

[11] 4,281,880
[45] Aug. 4, 1981

[54] BACK-TO-BACK PROPORTIONING VALVE

[75] Inventors: Robert F. Gaiser, Stevensville; Samuel E. Stone, Berrien Springs, both of Mich.

[73] Assignee: The Bendix Corporation, Southfield, Mich.

[21] Appl. No.: 80,892

[22] Filed: Oct. 1, 1979

[51] Int. Cl.³ .............................................. B60T 8/26
[52] U.S. Cl. ................................... 303/6 C; 188/349; 303/84 A
[58] Field of Search ............ 303/6 C, 84 A; 188/349, 188/151 A

[56] References Cited

U.S. PATENT DOCUMENTS

| 3,450,443 | 6/1969 | Bueler | 303/6 C |
|---|---|---|---|
| 3,917,355 | 11/1975 | Takeuchi | 303/6 C |
| 3,970,347 | 7/1976 | Mizusawa | 303/6 C |
| 3,975,060 | 8/1976 | Hirayama | 303/6 C |

Primary Examiner—Douglas C. Butler
Attorney, Agent, or Firm—Leo H. McCormick, Jr.; Ken C. Decker

[57] ABSTRACT

A back-to-back proportioning valve assembly for a cross-split braking system is disclosed. The proportioning valve assembly comprises an assembly housing defining a substantially cylindrical bore extending therethrough. The bore defines first and second rear brake outlet openings. In the assembly housing are disposed a pair of inlet passages extending within the cylindrical bore connected with respective first and second master cylinder chambers. A pair of front brake outlet openings are also disposed in the assembly housing. First and second proportioning valves are positioned in back-to-back relationship within the cylindrical bore adjacent respective first and second rear brake outlet openings for proportioning the inlet pressure to the rear brake outlets. A pair of bypass channels, for bypassing each of the proportioning valves, are provided to be opened upon failure of one of the braking systems. A differential pressure piston, in the form of a cylindrical spool, is disposed within the cylindrical bore to overlie the bypass channel ports. Upon failure of one of the braking systems, the differential piston shifts, thus opening one of the bypass ports and providing a direct fluid communication path from the inlet passage to the rear brake outlet opening, thus bypassing the proportioning valve.

9 Claims, 5 Drawing Figures

BACK-TO-BACK PROPORTIONING VALVE

BACKGROUND OF THE INVENTION

Dual, or back-to-back, proportioning valves have been used in hydraulic braking systems for vehicle brakes, particularly on cross-split automotive braking systems. A cross-split braking system includes a first braking system defined by one master cylinder chamber interconnected with one front and an opposite rear brake hydraulic system. A second braking system includes the second master cylinder chamber interconnected with the other front and an opposite rear hydraulic braking system.

Both separate and back-to-back proportioning valves have been used in the fluid path between the master cylinder chamber and the rear brake hydraulic actuator, such as the rear brake wheel cylinder, in cross-split braking systems. Such proportioning valves permit the brake pressure at the rear wheels to rise in direct portion to the input pressure received from the master cylinder chamber until a predetermined pressure is obtained. Thereafter, the brake pressure at the rear wheels rises at a lesser rate than the input pressure from the master cylinder chamber. In such proportioning valves, should brake failure occur in one of the first and second braking systems brake pressure continues to be applied to the other half of the system. Brake pressure to the rear wheel brake of the operative system continues to be transmitted through the proportioning valve associated with the rear wheel brake. In such a failure condition, no means are provided for bypassing the proportioning valve to permit full brake pressure to be applied to the rear wheel brake.

As shown in U.S. Pat. No. 3,480,333, proportioning valves have been used in split braking systems, wherein one master cylinder chamber is interconnected with both front brakes, and the other master cylinder chamber is interconnected with both rear brakes. The front and rear brakes comprise separate braking systems. Typically, the front braking system includes a metering valve arrangement. A proportioning valve is provided in the fluid path between the master cylinder and both of the rear brakes. If the front brakes fail, a bypass valve is provided to bypass the proportioning valve of the rear brakes in order to apply full pressure on both rear brakes.

SUMMARY OF THE INVENTION

The present invention provides for a dual, or back-to-back proportioning valve assembly, particularly for use in a cross-split vehicle braking system, having a bypass valve arrangement in each braking system. When half of the braking system fails, full brake pressure is applied to each wheel of the opposite system. That is, upon failure in the brake system fluid path between one master cylinder chamber and one front and opposite rear brake, full brake pressure is applied to the opposite front and rear brakes. The proportioning valve in the operative rear brake is bypassed.

The proportioning valve assembly of the present invention includes an assembly housing having a pair of inlets communicable with the master cylinder primary and secondary chambers. A pair of front brake outlets are provided in the housing, each of these front brake outlets being in direct fluid communication with separate inlets such that fluid pressure at each inlet is substantially equal to fluid pressure at the respective front brake outlets. The assembly housing also includes a pair of rear brake outlets in fluid communication with the separate inlets through separate proportioning valves positioned in back-to-back relationship in the housing. A pair of bypass conduits are provided for direct fluid communication, i.e., bypassing the proportioning valve, between an inlet and a respective rear brake outlet. A differential pressure piston is disposed within the housing to provide a valve for each bypass conduit. When the piston shifts in the housing, in response to differential pressure between the separate brake systems caused by fluid pressure failure in one of the systems, the bypass conduit of the operative brake system is opened to thus bypass the proportioning valve and to provide full brake pressure to the operative rear wheel brake cylinder.

It is thus an object of the present invention to provide a back-to-back proportioning valve for a cross-split braking system having a bypass valve arrangement for bypassing the proportioning valve when failure occurs in the opposite brake system.

It is a further object of the present invention to provide a back-to-back proportioning valve assembly, with a bypass valve arrangement, including a warning switch for indicating the occurrence of failure in one of the cross-split braking systems. The warning switch is preferably actuated in response to the shifting of the piston in the housing which occurs in response to differential pressure above a predetermined level.

Still further, it is an object of the present invention to provide a back-to-back proportioning valve that compensates for differential pressure levels that may exist between the primary and secondary master cylinder chambers in normal operation. Such compensation is provided by an equalizing spring disposed between the back-to-back proportioning valve housings that are disposed in the assembly housing.

Moreover, it is an object of the present invention to design a proportioning valve that reduces the rate of increase of fluid pressure from the master cylinder to the rear brake cylinder at a precise predetermined master cylinder pressure level.

It is an object of the present invention to provide a proportioning valve having a narrower bandwidth of operation about the predetermined pressure level by minimizing critical tolerances. By minimizing the critical tolerances, the bandwidth about which the proportioning valve is designed to operate is narrowed. That is, the predetermined level at which proportioning between the master cylinder pressure and the rear brake pressure begins is subject to more exact design.

Finally, it is an object of the present invention to provide a small and light weight assembly. Such object is accomplished by constructing the proportioning valve assembly from extruded or die cast aluminum.

These and other objects of the invention shall be apparent when reference is made to the following detailed description and drawings.

DETAILED DESCRIPTION OF THE DRAWINGS

Figure 1:
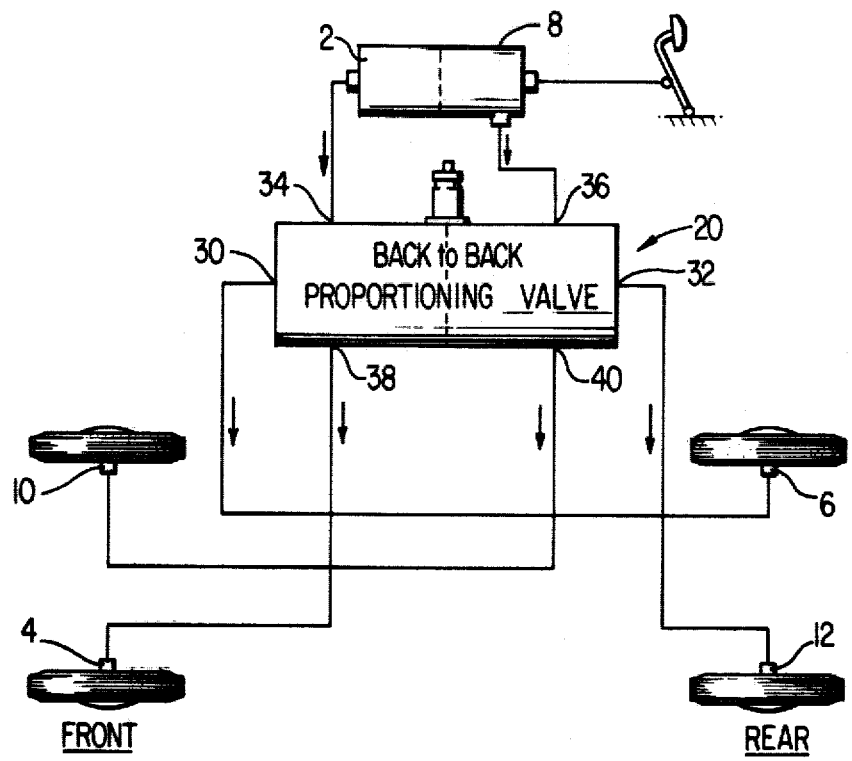
FIG. 1 is a general schematic diagram of the proportioning valve of the present invention in a hydraulic circuit for an automotive vehicle.

A dual, or back-to-back, proportioning valve assembly in a cross-split braking system for an automotive hydraulic brake system having front and rear brakes, is schematically depicted in FIG. 1. First and second hydraulic brake systems are defined. The first brake system is defined by a hydraulic path between a first master cylinder chamber 2, a left front hydraulic brake actuator 4, such as a hydraulic cylinder for actuating a front disc brake, and a right rear hydraulic brake actuator 6, such as a wheel cylinder for actuating a right rear drum brake. The second brake system is defined by a hydraulic path between a second master cylinder chamber 8, a right front hydraulic brake actuator 10, and a left rear hydraulic brake actuator 12. A back-to-back proportioning valve assembly 20 is interconnected in the piping or tubing between the master cylinder chambers and the brakes, in a manner to be described.

Figure 2:
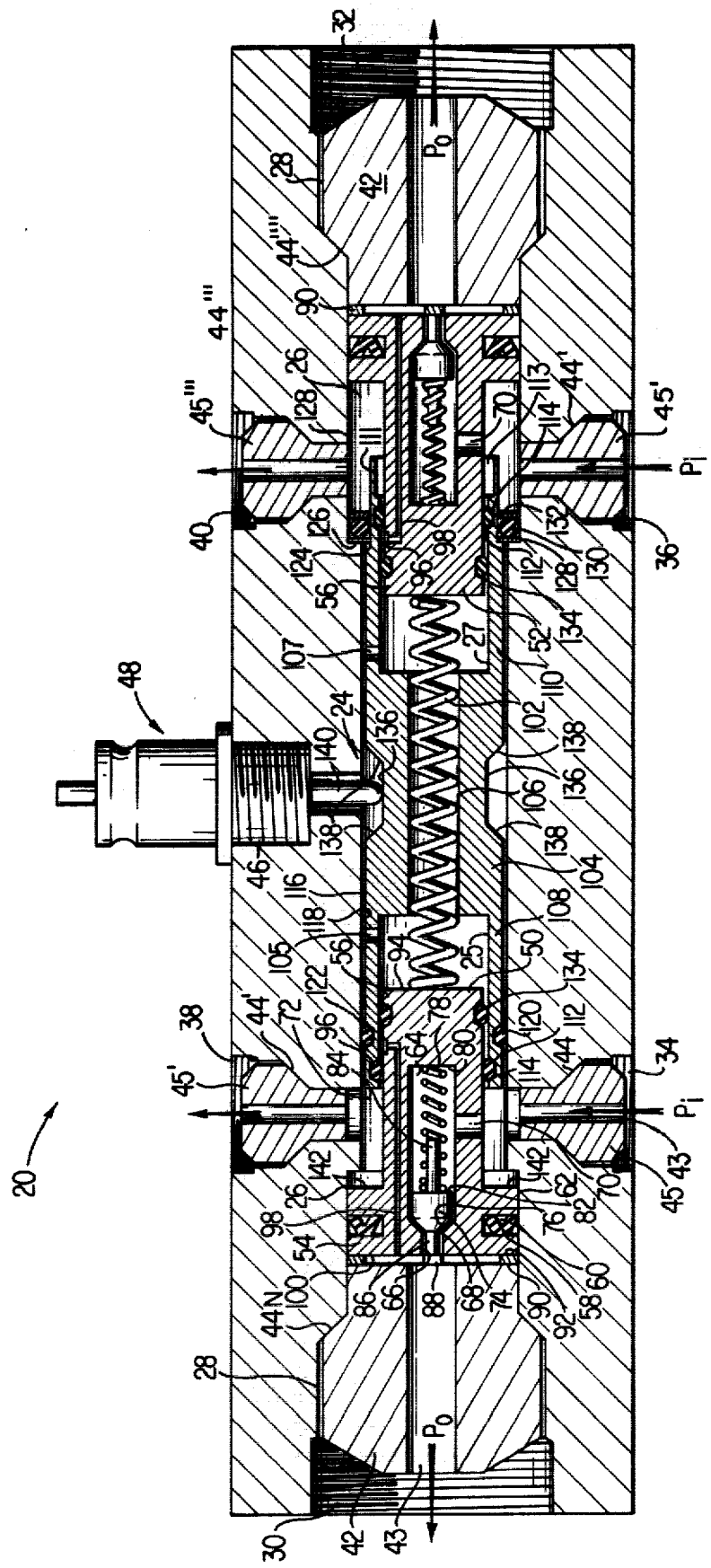
FIG. 2 is a longitudinal sectional view of one embodiment of the proportioning valve of the present invention.

The proportioning valve assembly 20 as shown in FIG. 2, comprises an assembly housing 22. The assembly housing 22 is an elongated member defining a substantially cylindrical bore 24 extending therethrough. Portions 26, 28 of the bore have different diameters to accommodate the different components disposed within the bore, as discussed further below. First and second outlet openings 30, 32, for communication with tubing leading to opposite rear brake hydraulic actuators 6, 12, are defined at opposite ends of the assembly housing 22. First and second inlet openings 34, 36 radial to the bore and extending from the assembly housing exterior to the bore interior are disposed adjacent opposite ends of the assembly housing 22. The first and second inlets 34, 36 are connected by tubing (not shown) to respective first and second master cylinder chambers 2, 8. Positioned substantially in the same cross-sectional plane from the respective first and second inlet openings 34, 36 are a pair of front brake outlet openings 38, 40 for connection to tubing leading to respective front brake hydraulic actuators 4, 10.

The various inlet 34, 36 and outlet 30, 32, 38, 40 openings are preferably threaded for engaging complementary threaded tubing. Tube seats 42, 42' may be disposed in the first and second outlet openings for engaging the tubing. Likewise tube seats 45, 45', 45", 45''' may be disposed in the inlet openings 34, 36 and the front brake outlet openings 38, 40. The tube seats 42, 42', 45, 45', 45", 45''' engage with shoulders 44, 44' . . . 44$^N$ in the assembly housing 22. Bores 43 are coaxial with the tube seats 42 to provide fluid communication paths.

A radial opening 46 is defined in the assembly housing 22 between the pairs of inlet 34, 36 and front brake outlet openings 38, 40 for receiving a warning switch 48, the purpose and function of which will be described further below.

Positioned in the cylindrical bore 24 of the assembly housing 22, adjacent the first and second rear brake outlets 30, 32, are a pair of proportioning valve housings 50, 52. The proportioning valve housings 50, 52 are positioned in back-to-back relationship, and are substantially identical to each other in structure and function. Only one of the proportioning valve housings 50, 52 need be described.

The proportioning valve housing 50 is defined by two integral concentric cylinder portions 54, 56. The first cylindrical portion 54 has a diameter substantially equal to the inner diameter of the bore portion 26 of the assembly housing 22. A sealing ring 60 is positioned in a circumferential notch 58 defined in the outer cylindrical surface 62 of the first cylindrical portion 54 to prevent fluid passing between the outer cylindrical surface 62 and portion 26 of bore 24. The second cylindrical portion 56 extends longitudinally within the assembly housing bore 24.

Coaxially defined within the proportioning valve housing 50 is a cylindrical chamber 64 and a coaxial outlet port 66, the diameter of the outlet port 66 is substantially less than the diameter of the cylindrical chamber 64. A tapered portion 68 of the proportioning valve housing interconnects the walls of the cylindrical chamber 64 and the outlet port 66. The outlet port 66 is in communication with the rear brake outlet opening 30.

A radial inlet port 70 in the second cylindrical portion 56 provides a fluid communication path between the annular space 72, defined by the second cylindrical portion 56 and the assembly housing bore 24 walls, and the interior of the cylindrical chamber 64.

Disposed within the cylindrical chamber 64 is a poppet 74 having a poppet valve seat 76 complementary to the tapered portion 68 of the proportioning valve housing 50. A poppet biasing spring 78 extending from a rear face 80 of the cylindrical chamber 64 to a rear face 82 of the poppet 74, supports the poppet 74 in the cylindrical chamber 64 and biasses the poppet 74 in a direction toward the rear outlet opening 30. The poppet biassing spring 78 surrounds an axially extending poppet extension 84. A forwardly, or outwardly, axially extending poppet extension 86 extends through the outlet port 66 and seats upon a central flat 88 of a G-shaped disc 90. The poppet biassing spring 78 has a sufficient biassing force to maintain the poppet 74 biassed outwardly into engagement with the G-shaped disc 90 regardless of the longitudinal position of the proportioning valve housing 50 within the bore 25, as will be described below.

Figure 4:
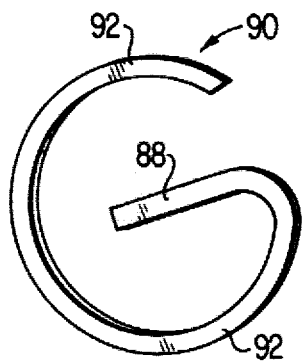
FIG. 4 is a perspective view of the G-shaped seating disc shown in FIGS. 2 and 3.

The G-shaped seating disc 90 is shown in FIG. 4. The diameter of the disc is substantially equal to the diameter of the cylindrical bore portion 26. The circumferentially positioned flats 92 provide a seating surface for the first cylindrical portion 54 of the proportioning valve housing 50.

Disposed adjacent to the inward facing end 94 of the proportioning valve housing 50, at the cylindrical surface of the second cylindrical portion 56, is a bypass port 96. The bypass port 96 communicates with a bypass channel 98 extending from the port 96 radially inward and then longitudinal to the major axis of the proportioning valve housing 22 to intersect the outward face 100 of the first cylindrical portion 54 of the proportioning valve housing 50. The bypass port 96 thus is communicable with the rear brake outlet opening 30.

Disposed longitudinally, i.e., along the major axis of the cylindrical bore 24 of the assembly housing 22 is an equalizing spring 102 which assists in biassing the proportioning valve housings 50, 52 toward the G-shaped seating discs 90. The equalizing spring 102 serves to compensate for differential pressures that exist in the master cylinder primary and secondary chambers 2, 8.

Ideally, the primary and secondary, or first and second, master cylinder chambers 2, 8 provide equal inlet pressure to the inlet openings 34, 36 of the assembly housing 22. In practice, however, such inlet pressures may not be precisely equal. The equalizing spring 102 ensures that equal forces will be distributed to both proportioning valve housings 50, 52 to balance the system.

A differential pressure piston in the form of an elongated cylindrical spool 104 is disposed within the bore 24 of the assembly housing 22. A bore 106 of the spool 104 has a reduced diameter from the end portion diameter to support and guide the equalizing spring 102. The opposite end portions 108, 110 of the spool 104 have an inner diameter slightly greater than the diameter of the second cylindrical portion 56 of the proportioning valve housing 50. The opposite end portions 108, 110 of the spool 104 are annular, substantially cylindrically shaped, and surround the second cylindrical portion 56 of the proportioning valve housings 50, 52 to overlie the bypass ports 96. The end portions 108, 110 define cylindrical bores 25, 27 that receive cylinder portions 54, 56 of the proportioning valve housings 50, 52. Vent openings 105, 107 are defined by the end portions 108, 110 to provide communication between cylindrical bores 25, 27 and the space between the outer cylindrical surface 116 of the spool 104 and the inner cylindrical surface 118 of the housing bore 24. The vent openings 105, 107 permit proportioning valve housings 50, 52 to move freely within the bores 25, 27. An O-ring seal 112 is positioned in an annular notch 114 of the inner cylindrical surfaces of the spool to provide a seal to prevent inlet fluid pressure from being transmitted through the bypass ports 96 when the spool end portions 108, 110 overlie the bypass ports 96.

Sealing is required between the outer cylindrical surface 116 of the spool 104 and the inner cylindrical surface 118 of the housing bore 24 in order to isolate the two braking systems. Such sealing is provided, at one end of the spool, by an O-ring seal 120 fitted within an annular notch 122 in the outer cylindrical surface 116 of the spool 104 and engaging the inner cylindrical surface 118 of the housing bore 24. Other seal arrangements can be used. For example, a lip seal (not shown) can be provided at the end portion of the spool instead the use of an O-ring seal.

The opposite end 110 of the spool 104 includes a hydraulic reset arrangement. An annular shoulder 124 is defined in the outer cylindrical surface 116 of the spool 104. Similarly, an annular shoulder 126 is defined in the inner cylindrical surface 128 of the housing 22. Abutting the two shoulders 124, 126 is a first washer 128, an O-ring 130, and a second washer 132, disposed in contact with each other. The two washers and O-ring provide a seal preventing fluid pressure transmission between the outer surface 116 of the spool and the inner cylindrical surface 118 of the bore 24. In the event that a hydraulic reset arrangement is not desired, the sealing arrangement of both ends 108, 110 of the spool 104 can be identical and similar to that shown in the end 108 of the spool 104 as shown in FIG. 2. The hydraulic reset operation will be described further below.

The opposite end 110 of the spool 104 further includes an annular lip 111 extending longitudinally from the end of the spool 104. Annular lip 111 defines an annular channel 113 between the lip 111 and the cylindrical surface of the second cylindrical portion 56 of the proportioning valve housing 52. When the spool 104 is shifted, in a manner to be described, such that the O-ring seal 112 moves to the left of the bypass port 96, the bypass port 96 is in fluid communication with the annular channel 113, and the inlet opening 36.

O-ring seals 134 are also provided adjacent the end face 94 of the second cylindrical portion 56 of the proportioning valve housings 50, 52. These O-ring seals 134 are in contact with the inner cylindrical surface of the spool.

Disposed around an intermediate portion of the spool 104 is a circumferential detent groove 136 having angularly disposed biassing surfaces 138. The detent groove is contacted by a plunger 140 of a warning switch 48 that is disposed in a radial opening 46 of the housing 22. The warning switch 48 is electrically connected with an audible or visual indicating means, not shown. When the spool 104 is shifted in one of two opposite directions a certain distance by a pressure differential, to be described below, the plunger 140 engages one of the biassing surfaces 138, and is moved upward to complete a switch circuit. The switch 48, per se, is known in the art.

The operation of the proportioning valve assembly will now be described. When the proportioning valve 20 is interconnected in the cross-split brake system as shown in FIG. 1, the inlet pressure $P_i$ at the inlet openings, 34, 36 as transmitted from the master cylinder primary and secondary chambers 2, 8, is applied direct to the front brake outlet openings 38, 40. The fluid path from the inlet ports 34, 36 to the front brake outlet ports 38, 40 are defined by an annular space 72 between the proportioning valve housing 50 and the assembly housing 22. Pressure increases at the inlet ports 34, 36 are transmitted directly to the front brakes through the front brake outlet ports 38, 40.

Considering proportioning valve housing 50, fluid pressure at the inlet port 34 is transmitted through the radial inlet port 70 in the second cylindrical portion 56 of the proportioning valve housing 50, into the cylindrical chamber 64, through the orifice defined between the poppet 74 and the tapered portion 68 of the proportioning valve housing 50, and through the outlet port 66 for communication with the rear brake outlet opening 30. Thus, in the above-described condition, the outlet pressure $P_O$ is substantially equal to the inlet pressure $P_i$. Proportioning valve housing 52 operates in a similar manner.

It is important to describe the relative forces acting upon the proportioning valve housing 50. The outlet pressure $P_O$ is in communication with an area $A_O$ defined by the end face 100 of the proportioning valve housing 50. Thus, a force equal to the output pressure $P_O$ multiplied by the effective area vector, defined by the end face area 100 of the proportioning valve housing in a direction inwardly, i.e., toward the center of the assembly housing, occurs. An opposite force on the proportioning valve housing is provided by the force $F_s$ of the equalizing spring 102, plus the force generated by the inlet pressure $P_i$ acting against the area vector $A_i$ directed toward the rear brake outlet 30 that communicates with the inlet pressure $P_i$. This latter area vector $A_i$ is primarily the annular area 142 defined by the first cylindrical portion 54 in communication with the inlet pressure $P_i$ and that portion of the area vector defined by the tapered portion 68 in the interior of the proportioning valve housing 50. It is essential for proper operation of the present invention that the effective area that communicates with the rear brake outlet pressure $P_O$ in a direction toward the interior of the housing 22 is greater than the effective area that communicates with the inlet pressure $P_i$ in a direction toward the rear brake outlet opening 30. That is, $A_O$ must be greater than $A_i$.

Since the operation of both proportioning valves 50, 52 are the same, only one need be described. As the brakes are applied, and the inlet pressure $P_i$ at the inlet port 34 increases, the pressure increase will be transmitted directly to the front brake outlet port 38 and through the proportioning valve housing 50 to the rear brake outlet port 30. As the inlet pressure $P_i$ increases, and the rear brake outlet pressure $P_O$ increases therewith, then at a predetermined pressure, the outlet pressure $P_O$ multiplied by the area $A_O$ will be greater than the inlet pressure $P_i$ multiplied by the area $A_i$ plus the force $F_s$ of the equalizing spring 102. That is, at a certain inlet pressure $P_i$, $$P_O A_O > P_i A_i + F_s$$

Figure 5:
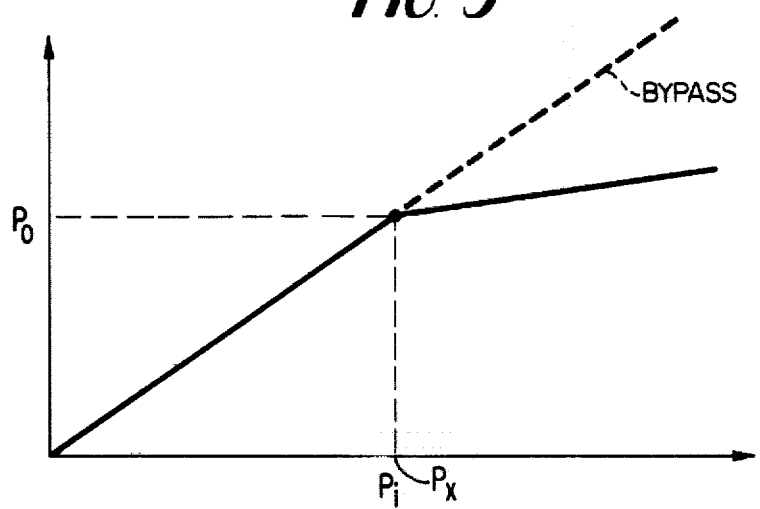
FIG. 5 is a graph of the inlet and rear brake outlet pressure relationship.

Thus, a force tends to move the proportioning valve housing 50 in a direction against the equalizing spring 102 such that the tapered portion 68 of the proportioning valve housing 50 mates with the poppet valve seat 76 of the poppet 74 and restricts the inlet pressure $P_i$ from the outlet pressure $P_O$. That is, the orifice defined by the poppet 74 and the tapered portion 68 of the proportioning valve housing 50 is restricted and minimal fluid communication will exist between the inlet opening 34 and the outlet opening 30. As the inlet pressure $P_i$ further increases, forces will then act on the proportioning valve housing 50 to shift it back into a position against the seating disc 90, again providing fluid communication between the inlet port 34 and the rear brake outlet port 30. Thus, an equilibrium point is reached and the outlet fluid pressure $P_O$ is proportioned, that is, will rise at a lower rate of increase than the rate of increase of the inlet pressure $P_i$ at the inlet opening 34. FIG. 5 is a graph indicating the inlet pressure increase and the rear brake outlet pressure $P_O$ increase. At a given inlet pressure $P_x$, the rate of increase of the outlet pressure $P_O$ tapers off and is less than the rate of pressure increase at the inlet port 34.

In designing the proportioning valve assembly 20 to provide proportioning at the predetermined inlet pressure $P_x$, it should be apparent that only the gap tolerance is critical. That tolerance is defined by the orifice dimension between the poppet valve seat 76 and the tapered portion 68 of the proportioning valve housing 50. Since the gap tolerance is critical, the bandwidth of operation about the pressure $P_x$ is relatively narrow. That is, one can ensure that the proportioning occurs as close as possible to the pressure $P_x$.

The inlet pressures $P_i$ at the two inlet ports 34, 36 act upon the end faces of the spool 104 and maintain the spool 104 in a given position, as shown in FIG. 2. Ideally, the inlet pressures $P_i$ from the two master cylinder chambers 2, 8 are substantially equal. However, slight inequalities between the inlet pressures does not effect spool movement. In the event of fluid pressure failure in one of the two cross-split brake systems, which may be caused by a leak in one of the fluid system lines, the pressure in the remaining, operative, brake system shifts the spool 104 in a direction toward the failed system. That is, considering FIG. 2, should the hydraulic system on the right side of the figure fail, the inlet pressure $P_i$ from the inlet port 34 acts upon the end face of the spool 104 and shift the spool 104 toward the right side of the figure. As the spool 104 shifts, the biassing surface 138 on the detent 136 forces the plunger 140 upwards to activate the warning switch 48. Likewise, as the spool 104 shifts, the end portion 108 of the spool 104 that overlies the bypass port 96 uncovers, or opens, the bypass port 96, thus providing direct fluid communication from the inlet port 34 to the bypass port 96, through the bypass channel 98, and to the rear brake outlet opening 30. Thus, the proportioning valve 50 is bypassed and full braking pressure is applied to both front and rear brakes.

Should fluid pressure fail in the braking system shown in the left side of FIG. 2, the inlet pressure $P_i$ at the inlet opening 36 acts against the end face of the spool 104 and shifts the spool 104 toward the failed braking system, i.e., the left side of the drawing. The spool 104 will shift a sufficient amount such that the annular channel 113 of the spool 104 overlies the bypass port 96 to provide a fluid communication path from the inlet 36, through the channel 113, through the bypass port 96, through the bypass channel 98, and to the rear brake outlet opening 32.

It should be noted that when the brakes are released, i.e., the inlet pressure $P_i$ drops, fluid flows from the outlet 30, around seal 58, to replenish fluid in annular space 72.

The hydraulic reset operation will now be described. Three areas need to be defined. Considering the left side of FIG. 2, the end portion of the spool 104 that is in communication with the inlet pressure $P_i$ defines an area $A_1$. This area $A_1$ includes the end face of the spool 104 and the two O-ring seals 112, 120. At the opposite end of the spool 104, the inlet pressure $P_i$ acts upon two areas; one area $A_2$ is defined by the second washer 132, the other area $A_3$ is defined by the end face of the spool 104 and the O-ring 112. $A_2$ plus $A_3$ is designed to be greater than $A_1$. Likewise, $A_1$ is designed to be greater than $A_3$. Let us assume that the spool 104, in response to a brake failure in the right-hand side of FIG. 2, has been shifted to the right of the drawing. The shoulder 124 on the spool 104 will move the washers 128, 132 and the O-ring 130 with the spool 104 toward the right. When the brake failure is corrected, and the inlet pressures $P_i$ become substantially equal, the pressure acting on area $A_2$ plus $A_3$ will result in a greater force than that force caused by the inlet pressure $P_i$ acting on the area $A_1$. Thus, the washers 128, 132, the O-ring 130, and the spool 104 will be shifted to the left until the washer 128 engages the shoulder 126 defined by the assembly housing 22. The spool will then be in its balanced, or operative, position. Assume now that a brake failure occurs in the braking system of the left side of FIG. 2, such that the spool 104 is shifted to the left. When the failure is corrected, and the inlet pressures $P_i$ are substantially equal again, the inlet pressure $P_i$ acting on Area $A_1$ will result in a greater force than the inlet pressure acting on area $A_3$. Thus, the spool 104 will be shifted toward the right into its balanced, or operative, position.

Figure 3:
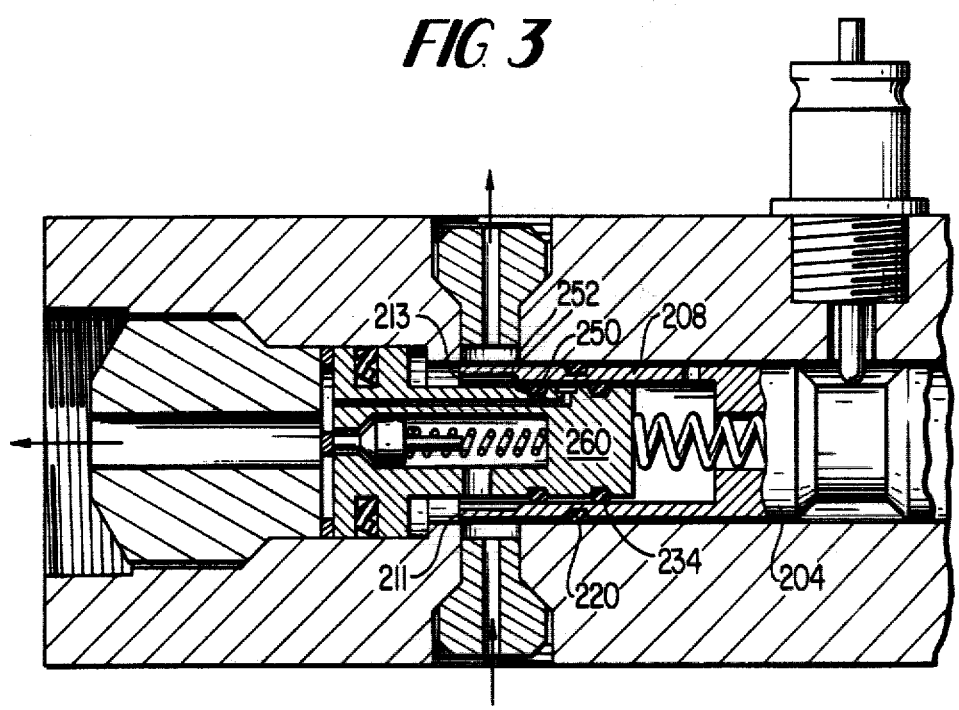
FIG. 3 is a partial longitudinal view of an alternate embodiment of the proportioning valve of the present invention.

FIG. 3 depicts an alternative embodiment for the portion 108 of the spool 104 of FIG. 2. In this alternative embodiment, the end portion 208 of the spool 204 includes an annular lip 211 extending from the end of the spool 204. The lip 211 defines an annular channel 213. The lip 211 and channel 213 are similar in design and function to the lip 111 and channel 113 of the FIG. 2 embodiment. O-rings 220 and 234 are provided to correspond with O-rings 120 and 134 of the FIG. 2 embodiment. An O-ring seal 250 is provided in a circumferential notch 252 in the outer cylindrical surface of the proportioning valve housing 260. The operation of the FIG. 3 embodiment is otherwise similar to the FIG. 2 embodiment.

Above, specific embodiments of the present invention have been described. It should be appreciated, however, that these embodiments were described for purposes of illustration only, without any intention of limiting the scope of the present invention. Rather, it is the intention of the present invention to be limited not by the above, but only as is defined in the appended claims.

What is claimed is:

1. A back-to-back proportioning valve assembly for a cross-split hydraulic braking system having separate first and second hydraulic brake system paths, said first brake system path including a first master cylinder chamber, a left front brake actuator and a right rear brake actuator, said second brake system path including a second master cylinder chamber, a right front brake actuator and a left rear brake actuator, wherein said proportioning valve assembly comprises:

a first housing defining first and second inlet openings for fluid communication with corresponding first and second master cylinder chambers, left and right front outlet openings for communication with corresponding left and right front brake actuators, and left and right rear outlet openings for fluid communication with corresponding left and right rear brake actuators;

first fluid path means within said first housing for direct fluid communication between said first inlet opening and said left front outlet opening such that the inlet fluid pressure at the first inlet opening is substantially equal to the outlet fluid pressure at the left front outlet opening;

second fluid path means within said first housing for direct fluid communication between said second inlet opening and said right front outlet opening such that the inlet fluid pressure at the second inlet opening is substantially equal to the outlet fluid pressure at the right front outlet opening;

a first proportioning valve means disposed in said first housing in fluid communication between said first inlet opening and said right rear outlet opening for proportioning the inlet fluid pressure at said first inlet opening with the outlet fluid pressure at said right rear outlet opening such that the outlet fluid pressure increases at a lower rate than the inlet fluid pressure, said first proportioning valve means having a second housing with a substantially cylindrical first chamber therein, said cylindrical first chamber having a first inlet port connected to said first inlet opening, said cylindrical first chamber having a first outlet port connected to said right outlet openings, said first proportioning valve having a first poppet located in said cylindrical first chamber to define a first orifice between the first poppet and said first outlet opening;

a second proportioning valve means disposed in said first housing in fluid communication between said second inlet opening and said left rear outlet opening for proportioning the inlet fluid pressure at said second inlet opening with the outlet fluid pressure at said left rear outlet opening such that the outlet fluid pressure increases at a lower rate than the inlet fluid pressure, said second proportioning valve means having a third housing with a substantially cylindrical second chamber therein, said cylindrical second chamber having a second inlet port connected to said second inlet opening, said cylindrical second chamber having a second outlet port connected to said left outlet opening, said second proportioning valve having a second poppet located in said cylindrical second chamber to define a second orifice between the second poppet and said second outlet opening;

a first disc located between said first outlet opening and said first proportioning valve means, said first disc having a first projection that extends into said first outlet opening;

a second disc located between said second outlet opening and said second proportioning valve means, said second disc having a second projection that extends into said second outlet openings;

first resilient means for urging said first poppet into continual engagement with said first projection;

second resilient means for urging said second poppet into continual engagement with said second projection;

means for moving said second and third housing of said first and second proportioning valve means with respect to said first and second poppets to adjust the size of the first and second orifices to compensate for changes in the inlet fluid pressure received from the first and second master cylinder chambers;

a first bypass means in said housing for bypassing said first proportioning valve means to provide direct fluid communication between said first inlet opening and said right rear outlet opening when a predetermined first pressure differential develops between the fluid in the first and second master cylinder chambers as presented to the first and second inlet openings, said bypass means allowing the respective pressures at said first inlet and right rear outlet opening to be substantially equal; and a second bypass means in said housing for bypassing said second proportioning valve means to provide direct fluid communication between said second inlet opening and said left rear outlet opening when a predetermined fluid pressure differential develops between the fluid in the first and second master cylinder chamber as presented to the first and second inlet openings, wherein respective pressures at said second inlet and left rear outlet openings are substantially equal.

2. The valve assembly of claim 1 further comprising failure indicating means for providing a signal in response to fluid pressure failure in fluid communication paths between the master cylinder and the brakes, said failure indicating means comprising means for detecting a predetermined pressure differential between the first and second hydraulic brake system paths.

3. The valve assembly of claim 1 wherein said first bypass means comprises a first bypass fluid channel between said first inlet opening and said right rear outlet opening, said second bypass means comprises a second bypass fluid channel between said second inlet opening and said left rear outlet opening, and means for opening and closing said first and second bypass fluid channels in response to a predetermined pressure differential between said first and second hydraulic brake system paths.

4. The valve assembly of claim 3 wherein said means for opening and closing said first and second bypass fluid channels comprises a piston positioned within said housing, said piston defining a pair of valve elements for opening and closing respective first and second bypass fluid channels, said piston responsive to a predetermined pressure differential between said first and second brake system paths for opening and closing said first and second bypass fluid channels.

5. The valve assembly of claim 4 wherein said piston comprises a substantially cylindrical spool positioned within a cylindrical opening in said housing, said pair of valve elements defined by a pair of recesses at opposite ends of the spool, said first and second bypass fluid channels extending from within said respective recesses to respective left and right rear outlet openings, said opposite ends of said spool in fluid communication with first and second brake system paths such that the fluid pressures in the first and second brake system paths exert opposite forces on the ends of said spool, said spool shiftable in response to a predetermined pressure differential between the first and second brake system paths to open one of the first and second bypass fluid channels.

6. The valve assembly of claim 5 further comprising failure indicating means for providing a signal in response to a predetermined pressure differential in the first and second brake system paths, said failure indicating means including a movable plunger supported within said housing and engaging a detent in the spool, said plunger movable in response to spool shifting beyond a predetermined distance corresponding to said predetermined pressure differential.

7. The valve assembly of claim 1 wherein said first and second proportioning valve means are disposed in back-to-back relationship within the assembly housing.

8. The valve assembly of claim 7 wherein said outlet port extends coaxially with said cylindrical chamber.

9. The valve assembly of claim 7 further comprising spring means in engagement between said first and second proportioning valve means for biassing each proportioning valve means in a direction away from each other.

* * * * *